Patented Oct. 16, 1945

2,387,040

UNITED STATES PATENT OFFICE 2,387,040

PREPARATION OF NUCLEIC ACID

Sutton Redfern, Bronx, N. Y., assignor to Standard Brands Incorporated, New York, N. Y., a corporation of Delaware No Drawing. Application March 1, 1944,
Serial No. 524,839

15 Claims. (Cl. 260—210)

The invention relates to a method for the preparation of nucleic acid. More particularly, it pertains to separation of nucleic acid from a material containing it, and includes correlated improvements and discoveries whereby such separation is facilitated.

An object of the invention is the provision of a method for the preparation of nucleic acid through separation of an insoluble salt thereof and its subsequent purification.

Another object of the invention is to provide a method for the preparation of nucleic acid by the production first of an alkaline earth metal salt, and purification thereof through dissolution in a solution of an alkali metal acetate, and conversion into nucleic acid.

An additional object of the invention is to provide for the preparation of nucleic acid by a procedure which may be practiced commercially in an expeditious, ready and efficacious manner.

A more particular object of the invention is the preparation of nucleic acid from yeast through hydrolysis thereof, conversion of nucleic acid into calcium nucleate, dissolution in a solution of sodium acetate and, following acidification, effecting precipitation of nucleic acid by means of alcohol.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In the practice of the invention, nucleic acid may be prepared from a material containing it by hydrolyzing the nucleic acid-containing material with a caustic alkali which may be either sodium or potassium hydroxide, neutralizing the hydrolysate so obtained, separating solid from liquid, adding a water soluble calcium salt to separated liquid, as calcium chloride and calcium acetate, and adjusting the acidity whereby precipitation of calcium nucleate ensues. The calcium nucleate may be separated from the liquid, as by a suitable filtering means, and, following washing with alcohol, it may be dissolved in a solution of an alkali metal acetate, i. e., sodium or potassium acetate. Desirably, the dissolution is accomplished under the influence of heat, as by heating for one hour at a temperature of about 70° C., followed by separation of solid and liquid, desirably while hot, the filtrate so obtained may then, if desired, and for clarification, be cooled to a temperature of about 5° C., and again filtered.

To the filtrate thus produced there may be added alcohol, as ethyl alcohol, and the acidity adjusted whereby nucleic acid is precipitated. The nucleic acid may now be separated, as by filtering, washed with alcohol and dried, suitably under vacuum. It has been found also that formation of calcium nucleate may be occasioned by hydrolyzing the nucleic acid-containing material, as a yeast, separating solid and liquid, then adding a water soluble calcium salt, followed by acidification. This leads to the precipitation of calcium nucleate, which may be separated from liquid by filtering, and then washed with alcohol and dried. It is then in suitable condition for purification by dissolution in a solution of an alkali metal salt and succeeding steps, as outlined above.

More particularly, nucleic acid may be produced from yeast by hydrolyzing it with sodium hydroxide, followed by neutralization first, with a strong mineral acid, as hydrochloric acid, followed by an organic acid, as glacial acetic acid, to give a pH value which may be from about 5.2 to 6.8. To the neutralized solution following filtration to remove yeast residue, calcium chloride is added, with agitation for about fifteen minutes, whereupon the mass is acidified with hydrochloric acid to a pH from about 2.0 to 3.0, preferably about 2.5. This leads to the precipitation of calcium nucleate which may be separated by filtering, and purified somewhat by washing with alcohol, drying, again washing with alcohol, and finally drying. Crude calcium nucleate so obtained is then dissolved in a solution of an alkali metal acetate, desirably sodium acetate under the influence of heat, which may be at a temperature of about 70° C. for a period of one hour. This solution may be filtered while hot, and in order to produce a clearer filtrate it may be cooled to a temperature of about 5° C., and held thereat for a period of about twelve hours. The cooled mass is now filtered at a temperature of about 5° C., and to the filtrate alcohol is added, suitably of 190 proof, and in an amount which is about 25% by volume. Acidification is effected immediately, as through the addition of 20° Bé. hydrochloric acid to a pH value from about 1.0 to 1.7, preferably about 1.1 to 1.2. The acidification is accompanied by agitation, which is continued for about thirty minutes, and leads to the precipitation of nucleic acid.

After stirring for about one-half hour the nucleic acid is separated by filtering, and thoroughly washed. Such may be accomplished by washing first with acidified alcohol, followed by two washings with a low proof alcohol and finally with a washing with high proof alcohol. The nucleic acid so produced may thereupon be dried, as by placement upon trays, heating under a vacuum from 28 to 29 inches at a temperature from 100 to 110° F. for a period of about 35 to 40 hours. A dried nucleic acid is thus obtained, and may be ground to desirable size, as such that it will pass through a 100 mesh screen or sieve.

As an illustrative embodiment of a manner in which the invention may be practiced, the following examples are presented:

EXAMPLE I 100 lbs. of yeast may be hydrolyzed by suspending it in water, diluting to a volume of about 35 gallons, and then admixing with about 5 gallons of a solution containing about 15 lbs. of sodium hydroxide. Hydrolysis takes place in about 45 minutes at a temperature of 10° C., whereupon hydrochloric acid and glacial acetic acid are added until the solution is neutral or slightly acid. Then, following filtration, about 4% of calcium chloride may be added to the filtrate and an amount of 20° Bé. hydrochloric acid to adjust the acidity to a pH value of about 2.5. Precipitation of calcium nucleate is thereby occasioned, and this may be separated, as by a filter press or a centrifuge and then washed with alcohol and dried. The calcium nucleate thus obtained may then be purified by dissolving in a solution of sodium acetate in the manner hereinafter outlined.

EXAMPLE II 200 lbs. of yeast may be hydrolyzed in the manner above set forth and, following filtration of the hydrolysate, the filtrate may have incorporated therewith about 35 lbs. of technical calcium chloride. The acidity of the reaction mass is adjusted through the addition of 20° Bé. hydrochloric acid to give a pH value of about 2.6 to about 2.7, with precipitation of calcium nucleate which settles with considerable rapidity. The calcium nucleate is obtained by filtration and, following washing with alcohol and drying, it is dissolved in a solution of sodium acetate containing about 20 lbs. in 20 gallons of hot water. The solution may be facilitated by heating for about one hour at 70° C., whereupon the reaction mass is filtered, preferably while hot. In order to secure a clear filtrate it is desirable to cool to about 5° C. for a period which may be about 12 hours, as overnight, and filtration effected while cold. To the filtrate there is then added about 25% by volume of alcohol and the mass acidified, as through the addition of 20° Bé. hydrochloric acid to a pH value from about 1.6 to 1.7. Nucleic acid is thus precipitated and, after stirring for a period, which may be about one-half hour, filtration is carried out and the residue or cake obtained is washed, desirably once with acidified alcohol, twice with a low proof alcohol, and once with a high proof alcohol. Thereupon the cake is dried and may be ground to a suitable size.

EXAMPLE III

Preparation of crude calcium nucleate

A solution of sodium hydroxide in water is prepared and hydrolysis of yeast brought about therein by incorporating a suspension of yeast therewith under agitation, which may be continued for about an hour, with maintenance of temperature at about 10° C. Thereafter neutralization may be carried out by the introduction of 20° Bé. hydrochloric acid initially, followed by the addition of glacial acetic acid until a neutral or slightly alkaline reaction to litmus is obtained, or until a pH value of about 6.5 to 6.8 is attained. This reaction mixture is then filtered and to the filtrate calcium chloride is added and the mixture agitated for about 15 minutes, whereupon with continued agitation 20° Bé. hydrochloric acid may be added slowly to give an acidity adjustment to a pH value from about 2.0 to 3.0, whereby formation and precipitation of calcium nucleate ensues. A cake of crude calcium nucleate is obtained by filtration, and this may be washed once with 190 proof alcohol and dried. The calcium nucleate so obtained may then be purified and converted into nucleic acid by the procedure immediately following.

Preparation of nucleic acid

Crude calcium nucleate, produced as above described, may be dissolved in a solution of sodium acetate, and this solution may be facilitated by the influence of heat, for example, at a temperature of about 70° C. The heating may be continued for a period of about 45 minutes and then the reaction mass may be filtered. Following washing of the residue, the calcium nucleate now being in solution, such solution for the purpose of further clarification may be cooled to about 5° C. with agitation, and allowed to remain at that temperature for a period of time, such as about 12 hours. This effects a flocculation and extraction of protein material which is separated by filtering the cold solution. To this solution alcohol of about 190 proof may now be added in an amount which is about 25% by volume of the filtrate, and this addition is followed immediately by the introduction of hydrochloric acid to acidify and adjust the acidity to a pH value of about 1.1 to 1.2. The reaction mixture is now agitated for about 30 minutes, with precipitation of nucleic acid which is separated in a suitable manner, as by passing through a filter press.

The residue or cake of nucleic acid may now be washed, as first with an acidified low proof (160) alcohol, then with two washings with low proof alcohol, followed by final washing with a high proof (190) alcohol. The thus purified residue or cake may now be dried, as by spreading on trays and placing in a dryer maintained at a temperature of 100 to 110° F. under a vacuum of 28 to 29" for a period from about 35 to 40 hours. As a final step, the dry nucleic acid may be ground to a size which will pass a 100 mesh screen or sieve.

The foregoing procedures lead to the preparation of nucleic acid of high yield from yeast and of relatively high purity. This is evidenced by the following tabulation of analyses of the products obtained.

| Product | Analysis | | |
| --- | --- | --- | --- |
| | Per cent N | Per cent P | N/P |
| Crude Ca-nucleate | 13.20 | 8.01 | 1.65 |
| Purified nucleic acid | 13.16 | 7.88 | 1.67 |
| Crude nucleic acid | 11.77 | 7.21 | 1.63 |
| Crude Ca-nucleate | 12.78 | 7.82 | 1.63 |

The results just given above are of significance in that the percentage of nitrogen is markedly high for crude products. Moreover, that the high nitrogen content is not due to accompanying materials is demonstrated by the phosphorus content and the N/P ratio. Furthermore, the nitrogen percentages may be compared with crude material obtained otherwise, which gives only about 10% notrogen on a dry basis. Inasmuch as the above results are on what may be termed an "as is" basis, they would be about 5 to 10% higher on a dry basis. It may be added that the method possesses an added advantage in that the conversion in.to and isolation through the calcium salt leads to a pure product and a distinctly higher yield than when isolation is effected solely by precipitation with alcohol.

The purity of nucleic acid produced as herein described is evidenced also by the following analytical results:

*Analysis of P-17*

|  | As is basis | Dry basis |
| --- | --- | --- |
| Per cent N | 14.47 | 15.70 |
| Per cent P | 8.55 | 9.28 |
| Per cent Ca | 0.69 | 0.75 |
|  |  | $\frac{N}{P}=1.69$ |
| Per cent H²0 | 7.82 |  |

Additionally, the Biuret test was negative, solubility in sodium hydroxide and in ammonium hydroxide was clear and complete, and the nucleic acid was practically white.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, which I claim as new and desire to secure by Letters Patent is:

1. A method for the preparation of nucleic acid, which comprises hydrolyzing yeast with a caustic alkali for a period and at a temperature sufficient to effect release of nucleic acid, but insufficient to cause any substantial decomposition thereof, neutralizing the hydrolysate, filtering, adding a water soluble calcium salt, adjusting acidity with precipitation of calcium nucleate, separating calcium nucleate from liquid, dissolving thus separated nucleate in a solution of an alkali metal acetate, separating solid and liquid, adding alcohol thereto, and acidifying whereby precipitation of nucleic acid is effected.

2. A method for the preparation of nucleic acid, which comprises hydrolyzing yeast with a caustic alkali for a period and at a temperature sufficient to effect release of nucleic acid, but insufficient to cause any substantial decomposition thereof, neutralizing the hydrolysate, filtering, adding a water soluble calcium salt, with precipitation of calcium nucleate, separating calcium nucleate from liquid, dissolving thus separated nucleate in a solution of an alkali metal acetate, separating solid and liquid, adding alcohol thereto, and acidifying whereby precipitation of nucleic acid is effected.

3. A method for the preparation of nucleic acid, which comprises hydrolzying yeast with sodium hydroxide for a period and at a temperature sufficient to effect release of nucleic acid, but insufficient to cause any substantial decomposition thereof, neutralizing the hydrolysate, filtering, adding a water soluble calcium salt, adjusting the acidity to a pH value from about 2.0 to 3.0 with precipitation of calcium nucleate, separating calcium nucleate from liquid, dissolving thus separated nucleate in a solution of an alkali metal acetate, separating solid and liquid, adding alcohol thereto, and acidifying whereby precipitation of nucleic acid is effected.

4. A method for the preparation of nucleic acid, which comprises hydrolyzing yeast with sodium hydroxide for a period and at a temperature sufficient to effect release of nucleic acid, but insufficient to cause any substantial decomposition thereof, neutralizing the hydrolysate, filtering, adding calcium chloride, adjusting the acidity to a pH value from about 2.0 to 3.0 with precipitation of calcium nucleate, separating calcium nucleate from liquid, dissolving thus separated nucleate in a solution of an alkali metal acetate, separating solid and liquid, adding alcohol thereto, and acidifying whereby precipitation of nucleic acid is effected.

5. A method for the preparation of nucleic acid, which comprises hydrolyzing yeast with sodium hydroxide for a period and at a temperature sufficient to effect release of nucleic acid, but insufficient to cause any substantial decomposition thereof, neutralizing the hydrolysate, filtering, adding calcium chloride, adjusting the acidity to a pH value from about 2.0 to 3.0 with precipitation of calcium nucleate, separating calcium nucleate from liquid, dissolving separated calcium nucleate in a solution of sodium acetate, filtering, and then adding alcohol and acidifying whereby precipitation of nucleic acid is effected.

6. A method for the preparation of nucleic acid, which comprises hydrolyzing yeast with sodium hydroxide for a period and at a temperature sufficient to effect release of nucleic acid, but insufficient to cause any substantial decomposition thereof, neutralizing the hydrolysate, filtering, adding calcium chloride, adjusting the acidity to a pH value from about 2.0 to 3.0 with precipitation of calcium nucleate, separating calcium nucleate from liquid, dissolving separated calcium nucleate in a solution of sodium acetate with heating, filtering, and then adding alcohol and acidifying whereby precipitation of nucleic acid is effected.

7. A method for the preparation of nucleic acid, which comprises hydrolyzing yeast with sodium hydroxide for a period and at a temperature sufficient to effect release of nucleic acid, but insufficient to cause any substantial decomposition thereof, neutralizing the hydrolysate, filtering, adding calcium chloride, adjusting the acidity to a pH value from about 2.0 to 3.0 with precipitation of calcium nucleate, separating calcium nucleate from liquid, dissolving separated calcium nucleate in a solution of sodium acetate with heating, filtering while hot, cooling, again filtering, and then adding alcohol and acidifying to a pH value from about 1.2 to 1.7 whereby precipitation of nucleic acid is effected.

8. A method for the preparation of nucleic acid, which comprises hydrolyzing yeast with sodium hydroxide for a period upwards to about one hour at a temperature of about 10° C., neutralizing the hydrolysate, filtering, adding calcium chloride, adjusting the acidity to a pH value from about 2.0 to 3.0 with precipitation of calcium nucleate, separating calcium nucleate from liquid, dissolving separated calcium nucleate in a solution of sodium acetate with heating, filtering while hot, cooling to a temperature of about 5° C., again filtering, adding alcohol in an amount of about 25% by volume, adjusting the acidity with hydrochloric acid to a pH from about 1.6 to about 1.7 whereby precipitation of nucleic acid is effected, filtering to separate the nucleic acid, and finally washing with alcohol and drying.

9. In a process for the preparation of nucleic acid, the improvement which comprises hydrolyzing yeast with a caustic alkali for a period and at a temperature sufficient to effect release of nucleic acid, but insufficient to cause any substantial decomposition thereof, separating solid and liquid, adding a water soluble calcium salt to separated liquid, and acidifying whereby precipitation of calcium nucleate takes place.

10. In a process for the preparation of nucleic acid, the improvement which comprises hydrolyzing yeast with sodium hydroxide for a period and at a temperature sufficient to effect release of nucleic acid, but insufficient to cause any substantial decomposition thereof, separating solid and liquid, adding calcium chloride to separated liquid, and acidifying with hydrochloric acid to a pH value from about 2.6 to 2.7 whereby precipitation of calcium nucleate takes place.

11. In a process for the preparation of nucleic acid, the improvement which comprises hydrolyzing yeast with sodium hydroxide for a period and at a temperature sufficient to effect release of nucleic acid, but insufficient to cause any substantial decomposition thereof, separating solid and liquid, adding calcium chloride to separated liquid, acidifying with hydrochloric acid to a pH value from about 2.6 to 2.7 whereby precipitation of calcium nucleate takes place, and finally washing with alcohol and drying.

12. In a process for the preparation of nucleic acid, the improvement which comprises dissolving calcium nucleate in a solution of an alkali metal acetate, separating solid and liquid, adding alcohol to separated liquid, and acidifying whereby precipitation of nucleic acid is effected.

13. In a process for the preparation of nucleic acid, the improvement which comprises dissolving calcium nucleate in a solution of sodium acetate, separating solid and liquid, adding alcohol to separated liquid, and acidifying to a pH value from about 1.2 to 1.7 whereby precipitation of nucleic acid is effected.

14. In a process for the preparation of nucleic acid, the improvement which comprises dissolving calcium nucleate in a solution of sodium acetate under the influence of heat, separating solid and liquid, adding alcohol to separated liquid in an amount about 25% by volume, and adjusting the acidity through the addition of hydrochloric acid to a pH value from about 1.2 to 1.7 whereby precipitation of nucleic acid is effected.

15. In a process for the preparation of nucleic acid, the improvement which comprises dissolving calcium nucleate in a solution of sodium acetate under the influence of heat, filtering while hot, cooling to a temperature of about 5° C., again filtering, adding alcohol to the filtrate in an amount about 25% by volume, adjusting the acidity through addition of hydrochloric acid to a pH value from about 1.6 to about 1.7 whereby separation of nucleic acid is effected, and finally again filtering, washing with alcohol and drying.

SUTTON REDFERN.